United States Patent [19] [11] Patent Number: 4,867,994
Perrine [45] Date of Patent: Sep. 19, 1989

[54] PROCESS FOR PRODUCING A COOKED, SLICED MEAT PRODUCT

[76] Inventor: Paul M. Perrine, 14 Paku Drive, Tairua, New Zealand

[21] Appl. No.: 1,696

[22] Filed: Jan. 9, 1987

Related U.S. Application Data

[63] Continuation-in-part of Ser. No. 810,054, Dec. 17, 1989, abandoned.

[51] Int. Cl.$^4$ .............................. A23L 1/01; A23L 1/31
[52] U.S. Cl. ...................................... 426/232; 426/315; 426/316; 426/319; 426/518; 426/523; 426/641; 426/393; 426/399
[58] Field of Search ............... 426/641, 518, 523, 232, 426/315, 316, 319, 393, 399

[56] References Cited

U.S. PATENT DOCUMENTS

| | | | |
|---|---|---|---|
| 3,526,521 | 9/1970 | Komarik | 426/641 X |
| 3,656,970 | 4/1972 | Wood | 426/523 X |
| 3,672,908 | 6/1972 | Hice, Sr. | 426/523 |
| 3,689,284 | 9/1972 | Nash et al. | 426/641 X |
| 3,753,741 | 8/1973 | Stewart | 426/641 |
| 3,859,644 | 1/1975 | Main | 426/233 X |
| 4,036,995 | 7/1977 | Koether et al. | 426/523 X |
| 4,195,098 | 3/1980 | Otto | 426/518 X |
| 4,278,697 | 7/1981 | Liebermann | 426/523 |
| 4,300,443 | 11/1981 | Morcos et al. | 426/523 |
| 4,376,131 | 3/1983 | Mori et al. | 426/523 |
| 4,516,486 | 5/1985 | Burkhart | 426/523 |
| 4,662,273 | 5/1987 | 426 | 523/ |
| 4,663,173 | 5/1987 | Clatfelter et al. | 426/641 X |

Primary Examiner—Robert J. Hill, Jr.
Assistant Examiner—Timothy M. McMahon
Attorney, Agent, or Firm—Mallinckrodt & Mallinckrodt

[57] ABSTRACT

The process for producing a sliced meat product includes the steps of partially cooking chunks of meat so that outside portions of the chunks reach temperatures above the temperature at which the meat is considered fully cooked while inside portions remain not fully cooked. One embodiment of the process includes slicing the meat chunks and adding to the slices sauce which is at a temperature above the temperature at which the meat is considered fully cooked, allowing the temperature of the meat and sauce to equalize at least to the extent that all meat reaches the temperature at which it is considered fully cooked, and portioning and packaging the product. Another embodiment of the process includes holding the partially cooked chunks of meat in a closed atmosphere so that the temperature of the meat chunks will at least partially equalize by the flow of heat from the higher temperature portions of the chunks to the lower temperature portions so that the entire chunks reach the temperature at which they are considered fully cooked. The chunks are then sliced, portioned, and packaged.

20 Claims, 4 Drawing Sheets

PROCESS FOR PRODUCING A COOKED, SLICED MEAT PRODUCT

RELATED APPLICATION

This application is a continuation-in-part of my copending application Ser. No. 810,054, filed Dec. 17, 1985 now abandoned.

BACKGROUND OF THE INVENTION

1. Field:

The invention is in the field of slicing apparatus for the continuous slicing of material such as raw or cooked meat and particularly such apparatus which incorporates a rotary slicing blade, and in methods of producing cooked sliced meat products.

2. State of the Art:

There are currently many types of rotary slicing apparatus in use for slicing raw or cooked meat products. The normal slicer has a round blade which rotates and is moved, while rotating, through the material to be sliced. The material to be sliced is mechanically advanced after each pass of the blade through it, the amount of advance determining the thickness of each slice. With such slicers, the material to be sliced must be in the form of a substantially uniform roll or slab so that it can be held by the feed mechanism and advanced the preset amount with respect to the blade after each pass of the blade. Further, with meat, the meat has to be substantially solid so has to be either cooked, frozen, or otherwise processed such as bacon in order to be successfully thinly sliced.

Several machines have been shown in the patent literature which use an arcuate or spiral blade extending from a rotating shaft to cut product as it is positioned with respect to the blade. U.S. Pat. No. 3,468,356 discloses such a multi-edged rotary blade for cutting products such as bacon which are fed as individual slabs into position under the blade so as the blade rotates, it moves through and slices the slab. U.S. Pat. No. 3,727,504, shows a rotary blade for cutting products such as steaks and chops having a blade which rotates and cuts through a piece of meat to be cut which is incrementally moved into position after each pass of the blade. A bacon slicing machine having a single edged rotary blade for slicing individual slabs of bacon which are incrementaly moved and positioned in the path of travel of the blade has been commercially available for a number of years from the Albright-Nell Co. of Louisville, Kentucky.

U.S. Pat. No. 1,973,526 shows a rotary spiral blade with a lead or pitch equal to slice thickness so that the blade slices a loaf to be cut as it moves by the blade. U.S. Pat. No. 2,742,937 shows rotary blades used to cut and chop meat as it passes through the blades and the meat is then extruded from the blade chamber as a finely chopped meat product.

There remains a need for a slicing apparatus that will accurately slice fresh raw meat as well as cooked, frozen or processed meat regardless of the shape, size, or rigidity of the piece to be sliced, into slices as thin as one thirty-second inch and to do so at high production rates.

SUMMARY OF THE INVENTION

According to the invention, material to be sliced, such as chunks of raw or cooked meat, are fed under pressure through a feed tube against an immediately adjacent cutter which includes at least one cutting edge and forms a stop for the material in the feed tube.

In one embodiment of the invention, the cutter takes the form of a rotary cutting blade having at least one cutting edge curvedly extending from a position a first distance from the center of rotation of the blade to a position a second, greater distance from the center of rotation of the blade and having a spacer positioned in the otherwise open areas between the cutting edge of the blade and the outer circumference of the blade so that together the blade and spacer form a cutter which substantially covers the material feed tube opening and blocks free flow of material therefrom.

In a second embodiment of the invention, the cutter takes the form of a disc with the blade extending therefrom to form a cutting edge spaced a preset distance from the surface of the disc and forming an opening through the disc immediately behind such blade.

In a third embodiment of the invention, the cutter takes the form of a drum with the blade extending outwardly from the surface of the drum to form a cutting edge a preset distance from the surface of the drum and forming an opening to the interior of the drum immediately behind such blade.

A process for preparing a sliced, cooked meat product includes passing pieces of meat through a cooker to begin cooking the meat by brining at least the outside surface of the meat to a temperature above the minimum temperature at which the meat is considered cooked, slicing the meat into slices and spraying a sauce at a temperature above the temperature at which the meat is considered cooked onto the slices as they are sliced, holding the meat slices and sauce together so that the heat of the outside of the meat and the sauce equalize with the inside of the meat so that the total mass of meat and sauce substantially equalize at a temperature above that at which the meat is considered cooked. The sliced cooked meat product is then portioned and packaged.

A second embodiment of the process includes passing the pieces of meat through a cooker to begin cooking the meat by bringing at least the outside surfaces of the meat to a temperature above the minimum temperature at which the meat is considered cooked, holding the meat pieces in a closed atmosphere so that the temperature of the meat pieces equalize by the flow of heat from the heated outside portions of the meat pieces to the cooler inside portions until the inside portions reach at least the temperature at which they are considered fully cooked, slicing the meat product, portioning the product and packaging the product.

It is preferred that the processes be carried out in a completely closed atmosphere from oven to packaging to keep the product in a substantially sterile atmosphere. In some cases, it may be desirable to modify the atmosphere by the addition of gases such as nitrogen or carbon dioxide. Such gas may be advantageously added during the slicing of the meat pieces.

THE DRAWINGS

In the accompanying drawings, which illustrate an embodiment of the invention constituting the best mode presently contemplated for carrying out the invention in actual practice:

FIG. 7, a fragmentary vertical section similar to that of FIG. 6, but showing a further embodiment of cutter;

FIG. 11, a vertical section taken on the line 11—11 of FIG. 10 but showing the cutter only schematically;

FIG. 12, a fragmentary section taken on the line 12—12 of FIG. 11;

FIG. 14, a block diagram illustrating a second embodiment of the process of the invention.

DETAILED DESCRIPTION OF THE ILLUSTRATED EMBODIMENT

Figure 1:
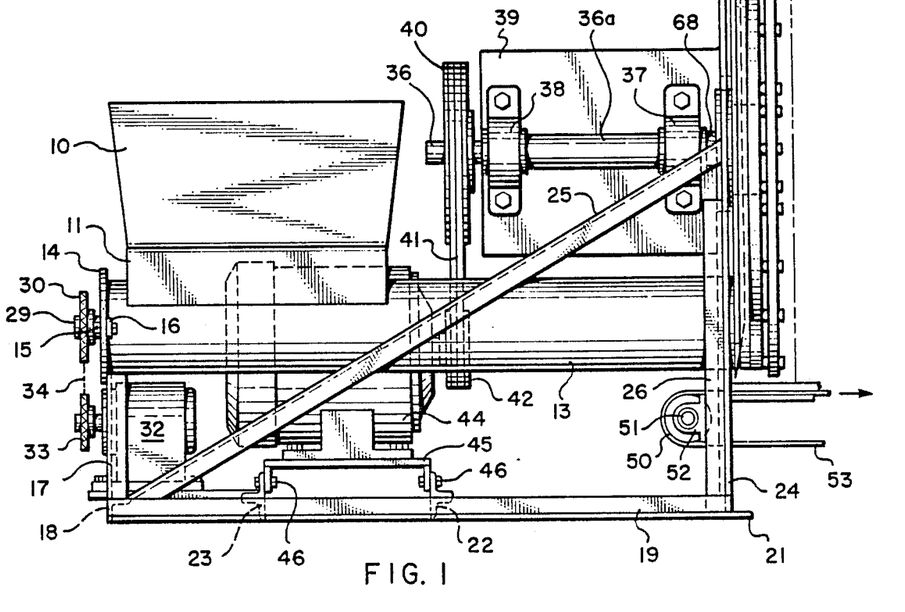
FIG. 1 is a side elevation of a slicing apparatus of the invention.
Figure 2:
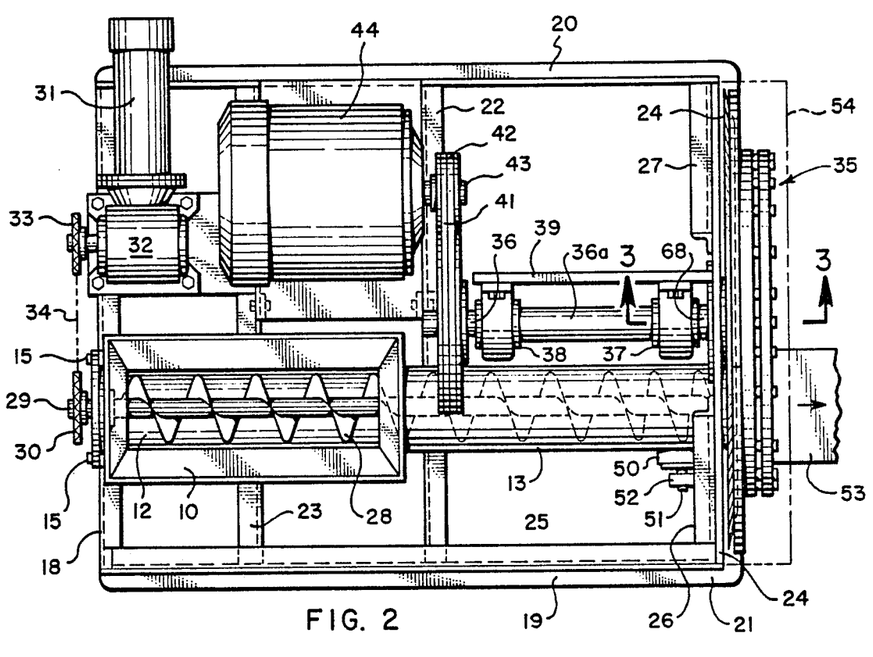
FIG. 2, a top plan view of the apparatus of FIG. 1.

As shown in FIGS. 1 and 2, a meat slicing apparatus includes a meat feed hopper 10 secured to walls 11 which form a feed opening 12 in feed tube 13. Feed tube 13 is closed at its end adjacent the feed hopper by tube end cover 14 held in place by bolts 15 which pass through ears 16 welded to the end of feed tube 13, and is supported by steel support angle iron 17 which is secured such as by welding between the feed tube 13 and angle iron 18 which forms an end of the support base for the apparatus. The remainder of the support base is made up of side angle irons 19 and 20; opposite end angle iron 21, and intermediate base pieces 22 and 23, each formed of a pair of angle irons secured back to back as shown in FIG. 1. The other end of feed tube 13 passes through and is supported by plate 24 which is secured such as by welding to base end angle iron 21 and braced in position by diagonal brace 25 and reinforcing braces 26 and 27, all also conveniently formed of angle iron. Reinforcing braces 26 and 27 extend from the bottom corners of plate 24 diagonally upwardly through part of the height of plate 24. The end of feed tube 13 that passes through plate 24 is the discharge end of the tube and, in the embodiment illustrated, extends slightly beyond the face of plate 24.

An auger 28 is provided within feed tube 13 to form a screw conveyor to move meat or other material from hopper 10 to the discharge end of tube 13 and to force the material out of the discharge end of tube 13. A shaft 29 extends from the end of auger 28, through bearings (not shown) in tube end cover 14, and has sprocket wheel 30 secured thereto. Electric motor 31 is coupled through gear box 32 to sprocket wheel 33 which is coupled to sprocket wheel 30 by chain 34 so that motor 31 causes rotation of auger 28. Auger 28 is supported only by the bearing in tube end cover 14. The other end of the auger is preferably free floating so there are no restrictions to product flow in tube 13.

A cutter assembly indicated generally by 35 is secured to shaft 36 which extends through plate 24 and is mounted for rotation in bearings 37 and 38 secured to mounting plate 39 welded to plate 24. Pulley 40 is secured to shaft 36 and is coupled by V-belt 41 to pulley 42 mounted on shaft 43 of motor 44. Motor 44 is mounted on mounting base 45 adjustably secured to base intermediate pieces 22 and 23 by bolts 46. Shaft 36 has an enlarged diameter portion 36a extending between and with respective ends or shoulders thereof abutting bearings 37 and 38. Bearings 37 and 38 are of a type, such as thrust bearings, which, in combination with enlarged shaft portion 36a, securely hold shaft 36 against linear movement. This ensures that cutter assembly 35 maintains a fixed position with respect to the discharge end of feed tube 13. This is important because the clearance between cutter assembly 35 and the discharge end of feed tube 13 must be very close, as will be discussed.

Conveyor end roller 50 is mounted on shaft 51 rotatably held in bearings 52 secured to plate 24 and supports conveyor belt 53 which is located under the outlet end of feed tube 13 to receive product sliced by cutter 35 and to carry it to a desired location. It is preferred for safety reasons to provide a cover 54 for the cutter which is shown in broken lines in FIGS. 1 and 2.

Figure 3:
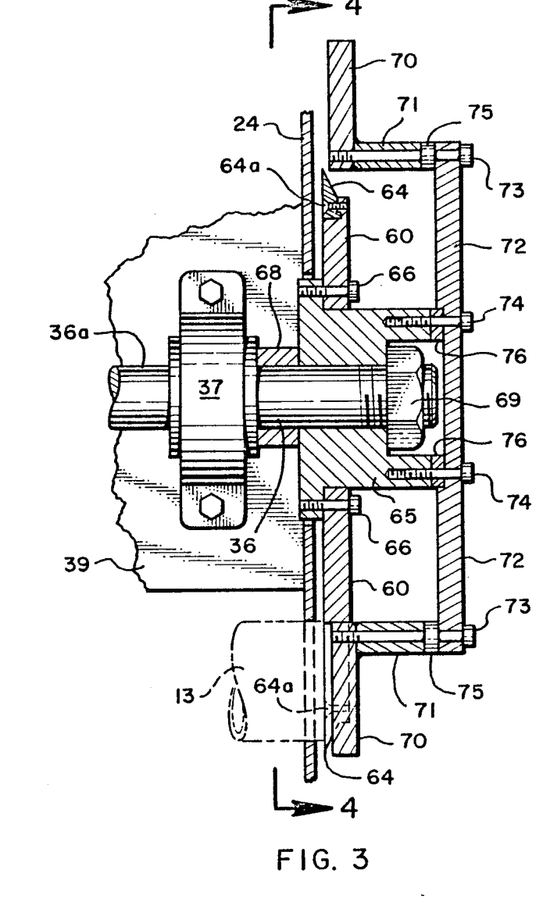
FIG. 3, a fragmentary vertical section through the cutter along the line 3—3 of FIG. 2.
Figure 4:
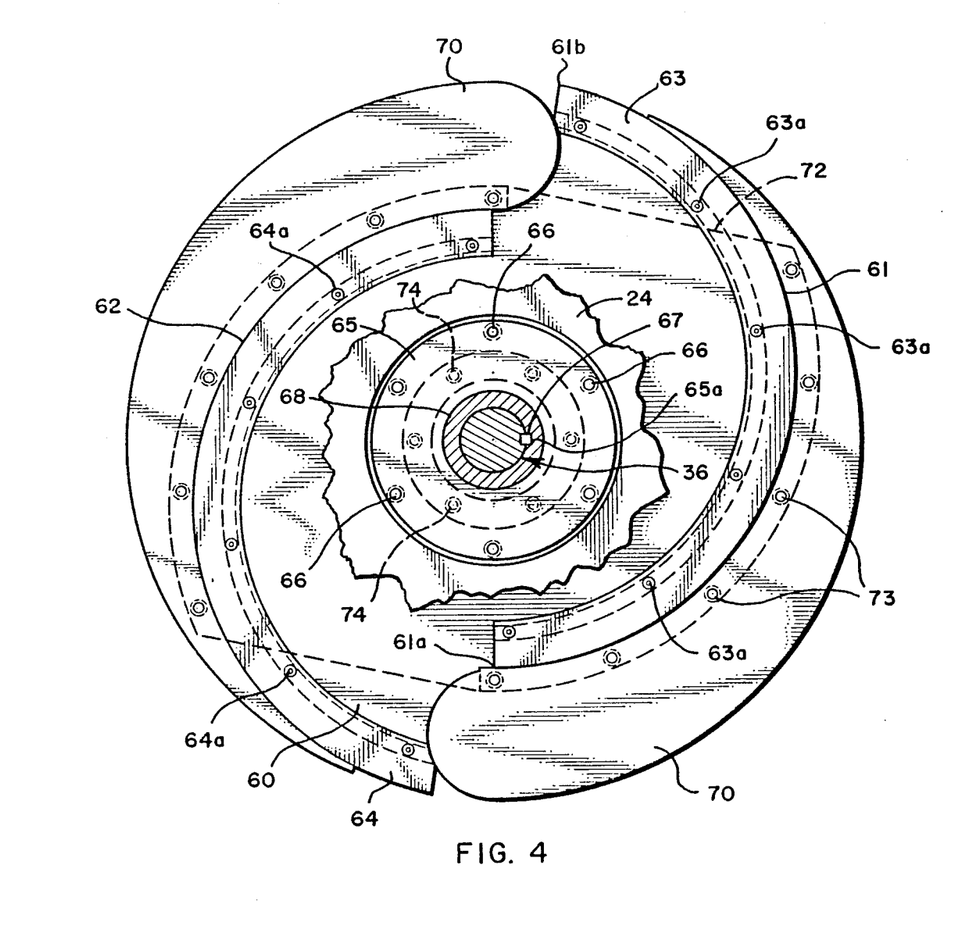
FIG. 4, a fragmentary vertical section taken on the line 4—4 of FIG. 3 with most of the mounting plate broken away to show the cutter in elevation.

Cutter 35 is shown in greater detail in FIGS. 3 and 4. As shown, the cutter includes a blade 60 having two cutting edges 61 and 62 which may be integrally formed as part of the blade or, as illustrated, may be formed by inserts 63 and 64, respectively, secured to the blade such as by screws 63a and 64a. The cutting edges extend in a smooth curve outwardly from an initial position, 61a shown with respect to cutting edge 61 in FIG. 4, which is a first distance from the center of rotation of the blade to a terminating position, 61b, a second and greater distance from the center of rotation of the blade. The curve of the cutting edges 61 and 62 of blade 60 may extend outwardly in a somewhat spiral configuration or, as shown, may be arcuate in configuration. The important thing is that the configuration provide a slicing action as the blade rotates so that the cutting edge will travel a greater distance laterally through material to be sliced than vertically and preferably with a ratio of at least about 4 to 1. Thus, for example, for a 4 to 1 ratio, the cutting edge of the blade will move four inches through the product for each inch of depth of cut of the product. A ratio of about 6 to 1 is presently preferred. A spiral configuration for the blade can be designed to keep the slicing action substantially constant whereas with an arcuate blade, the slicing action varies to some degree.

The blade 60 is secured to a hub 65 such as by screws 66 and the hub is secured to shaft 36. Key 67 is provided in keyways 36a and 65a of shaft 36 and hub 65, respectively, and spacer 68 is positioned about shaft 36 between hub 65 and bearing 37 to establish the position of hub 65 on the shaft. Nut 69 holds hub 65 position on shaft 36 against spacer 68.

In operation, as the blade rotates with shaft 36, cutting edges 61 and 62 move across the discharge end of feed tube 13 with the slicing action described, moving from the inside edge of the feed tube to the outside edge. With only the blade 60, however, it will be realized that with a cutting edge at the inside edge of the feed tube, the discharge end of the feed tube is substantially open and material is free to discharge from the tube. It is, therefore, necessary to fill this open space and thereby block the free discharge of material from the feed tube. For this purpose, and also to provide a gauge for adjusting the thickness of the slice to be cut, spacer plates 70 are provided to substantially fill the otherwise open areas between the cutting edges of the blade and the outer circumferential edge of the blade so that the discharge end of the feed tube is always substantially blocked. Spacers 70 with flanges 71 are secured to spacer support 72 by screws 73 and support 72 is secured to hub 65 by screws 74. In order to securely hold spacers 70 to support 72 and to make the position of spacers 70 adjustable, shims 75 are provided. Thus, in order to provide a greater or lesser distance between the cutting edges of the blade and the spacers to provide thinner or thicker slices, either thinner or thicker shims can be used. Also, shims 76 are provided between support disc 72 and hub 65 to provide additional adjustability of the spacers 70 relative to the blade 60.

It is important in order to obtain clean slices of material that the cutting edges of the blade pass close to the end of the feed tube so that a shearing action takes place in the material being sliced. This is particularly important at the outer edge of the feed tube away from the center of rotation of the cutter, i.e. the last part of the slice to be cut. The ideal situation would be for the blades to just touch the end of the tube and with an arrangement of the blade as shown with at least two cutting edges, one cutting edge would always be against the feed tube to thereby prevent the cutting edges from hitting or gouging the end of the feed tube. It is also preferred that at least the inside edge of the feed tube outlet have a sharp edge against the material to be sliced so that a scissor action is obtained to ensure a smooth cutting or shearing of the material to be sliced. This prevents strings of sinew material at the bottom of the slice. The closeness of the cutting edge to the feed tube outlet required to provide smooth, well cut slices will depend upon the material to be cut with more solid material being satisfactorily cut with greater clearances, but it is preferred for most raw or cooked meats that the clearance be generally less than about 15/1000 of an inch and preferably in the range from lightly touching to about 5/1000 of an inch.

The blade inserts 63 and 64 may be made of a material such as stainless steel or may be made of a long wearing material such as tungsten carbide. Tungsten carbide, as such, has not been approved yet for use with food products for human consumption in the United States so a similar material marketed under the name Tantung and made by V. R. Wessen Company in Chicago, Illinois, which is so approved may be used. When made from an extended wear material such as Tantung, rather than making the whole insert of such material which becomes expensive, it is preferred to make the insert of a stainless steel and to braze or otherwise attach the cutting edge in place as a further insert as shown in FIG. 6.

Figure 5:
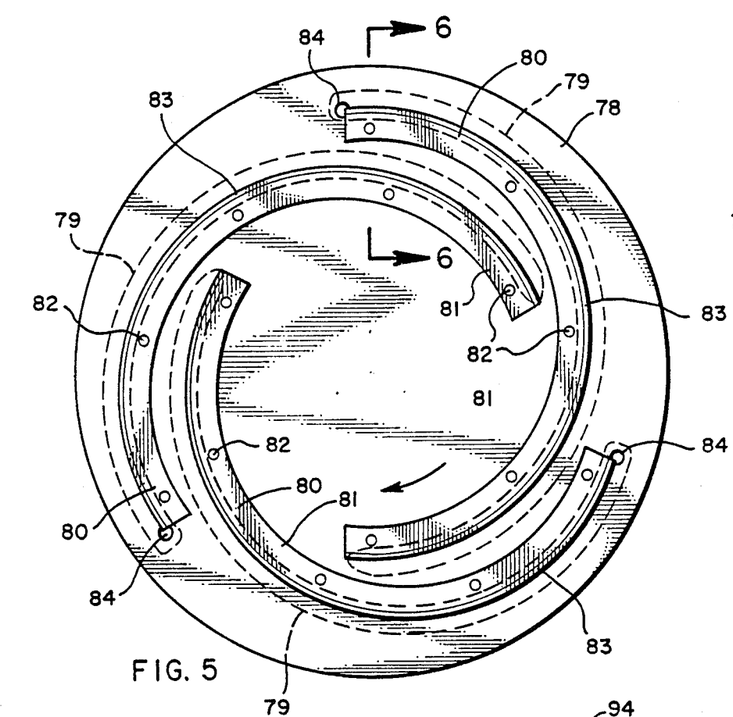
FIG. 5, a view similar to that of FIG. 4 showing an alternate embodiment of cutter in elevation.
Figure 6:
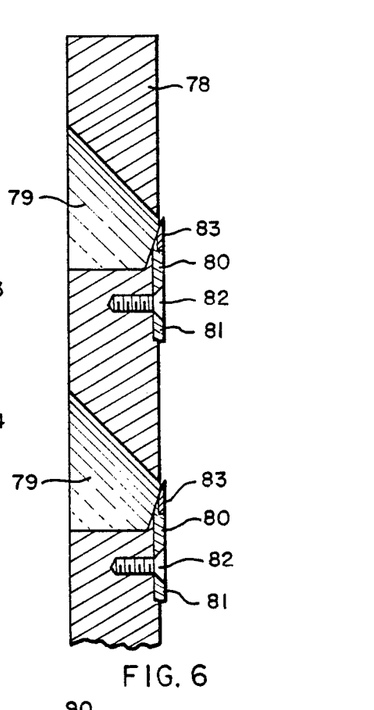
FIG. 6, a fragmentary vertical section taken on the line 6—6 of FIG. 5.

An alternate embodiment of cutter is shown in FIGS. 5 and 6. In such embodiment the cutter takes the form of a disc 78 having cutter openings 79 cut therethrough. Blade inserts 80 are mounted adjacent the openings 79 in recesses 81 provided to receive such inserts and are held in place by screws 82. Again, these inserts can be stainless steel or Tantung or, as shown, a Tantung cutting edge 83 can be secured by brazing or other means to an otherwise stainless steel insert.

With the cutter of FIGS. 5 and 6, there is no adjustable spacer plates provided. The thickness of the slice is determined by the distance the insert cutting edge extends beyond the face of the disc and the size of the opening between the cutting edge and the disc. The slice thickness can be adjusted by changing the blade inserts or by shimming out the blade insert to give a deeper cut into the material being sliced. When shimming the blade inserts or changing the blade insert, the position of the cutter must be adjusted to maintain the clearance between the cutting edges and the feed tube outlet.

With the blade configuration shown in FIGS. 5 and 6, it is preferred to provide enlarged holes 84 through disc 78 adjacent the trailing end of blade cutting edges 83 and connected to cutter openings 79 so that any material that might pass along blade cutting edges 83 without being cut will slide off the blade and pass through hole 84 rather than getting stuck and building up between the blade and the disc at the end of opening 79.

Figures 7, 10, 11, 12, 14:
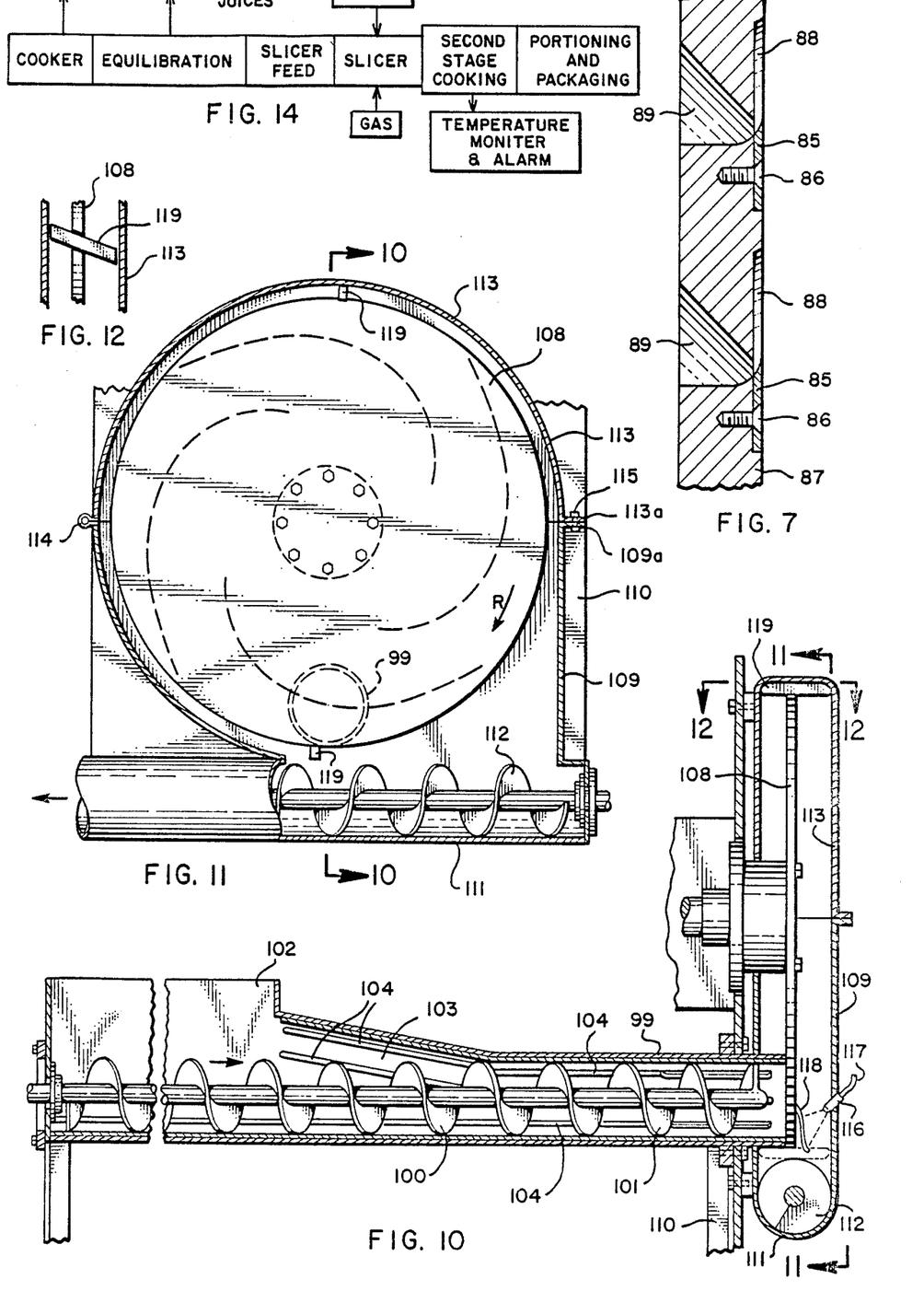

A further variation on a cutter as shown in FIGS. 5 and 6 is shown in FIG. 7 wherein blade inserts 85 are secured in recesses 86 in disc 87 and gauging recesses 88 are provided along cutter openings 89 opposite blade inserts 85. In such instance, the material to be sliced is forced into recesses 88 which effectively determine slice thickness. While the blade insert is shown as flush with the disc, it does not have to be so and the recesses 80 for the blade insert can be of different depth than the gauging recesses 88.

While curved cutting edges are shown and are preferred, it should be realized that straight cutting edges arranged at an angle to a radius could also be used and would provide the desired slicing action, although such action would vary more than when using a curved blade. Also, while in the embodiments illustrated in FIGS. 1–7 the feed tube discharges material to be cut in a direction parallel to the axis of rotation of the blade and the cutter is shown extending at right angles to the axis of rotation, this is not necessary as the cutter could, for example, be cone shaped and the cutting edges extend at an angle to the axis of rotation with the feed tube then also extending at an angle to the axis of rotation.

Figure 8:
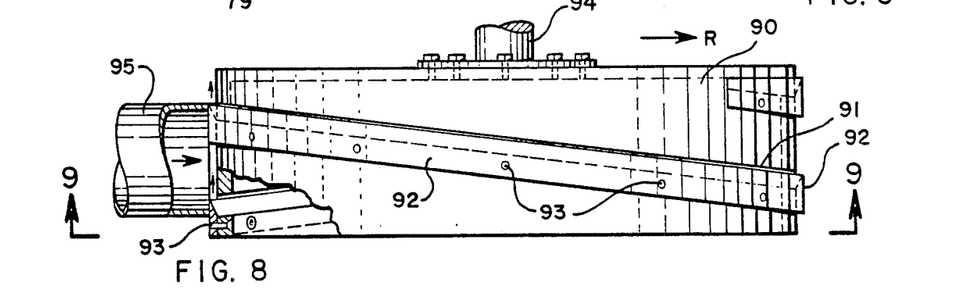
FIG. 8, a side elevation of a further alternate embodiment of cutter.
Figure 9:
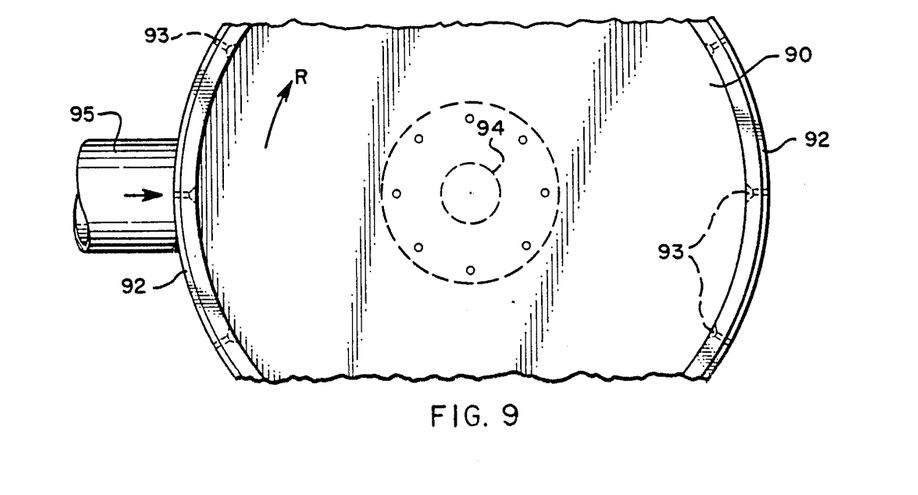
FIG. 9, a bottom plan view of the cutter of FIG. 8 taken on the line 9—9 of FIG. 8, FIG. 10, a fragmentary vertical section through a slicing apparatus such as shown in FIG. 1 but showing an alternate embodiment of screw conveyor construction and cutter housing.

A still further alternate embodiment of cutter is shown in FIGS. 8 and 9. In this embodiment the cutter is in the form of a drum 90 having slicing slots 91 cut therein with blade inserts 92 secured adjacent the slots 91 by screws 93. The cutter drum 90 is secured for rotation on shaft 94 arranged at right angles to the feed tube 95. The end of feed tube 95 is configured to follow the circumference of the drum as shown in FIG. 9 for the close tolerance fit described above. The apparatus and mounting means for shaft 94 would be appropriately modified in an obvious manner from the apparatus of FIGS. 1 and 2 so that drum 90 would preferably be vertically supported as shown in FIG. 8 and slices cut would fall downwardly from inside the drum to be collected and conveyed to a desired location. While the cutting edges of the blades are shown on the outside of the drum with feed from the outside, the cutting edges could also be located on the inside of the drum with feed appropriately located inside the drum. Sliced product would then discharge on the outside of the drum.

It is important for uniform and accurate slicing that the material to be sliced be forced from the discharge end of the feed tube against the blade and that the pressure against the cutter be substantially uniform over time for uniform slice thickness. It has been found that the pressure of the material against the cutter affects slice thickness and that slice thickness can be varied to some degree by merely varying the pressure of the material against the blade which is generally determined by the feed rate of material through the feed tube. Although the optimum feed rates and pressures will vary considerably for different types of meat, the temperature of the meat, and the condition of the meat such as raw or cooked, it has been found that pressures from about 5 PSI upwardly for raw meat and from about 3 PSI upwardly for cooked meat gives satisfactory slicing with the apparatus.

Any type of feed mechanism may be used to provide a pressure feed of material through the feed tube. Thus, a screw conveyor as shown can be used or a ram or other type of food pump. Further, a closed feed tube is not necessary in all cases and depending upon the material to be sliced, an open trough could be used.

While a single feed tube has been shown feeding the cutter, a number of feed tubes arranged about the axis of rotation of the cutter could be used so that several slices could be cut simultaneously as the blade rotates. Where more than one feed tube is used, the tubes could feed the same material to be cut, or could feed different material whose slices would be mixed as they fall from the cutter. Further, the cutter could have a single cutting edge, or multiple cutting edges. The feed tube outlet need not be round and where it is desired to increase the volume and size of a slice without increasing the size of the cutter, the feed tube outlet can be rectangular or oval in form. For example, a five inch diameter auger in a five inch diameter feed tube can be used to feed the material but the discharge end of the tube changed to a four by five inch rectangle or oval so that the cutting edges of the blade still need only extend radially outwardly for a distance of four inches.

While the pressure and feed rate have an effect on slice thickness, the speed of rotation of the cutter also has an effect which is interrelated to the pressure and feed rate. Thus, at a substantially constant pressure on the cutter, the faster the cutter rotates, the greater the number of slices of given thickness will be cut and the greater the feed rate or throughput of the product to be sliced. Conversely, at a substantially constant feed rate, the more slowly the cutter rotates, the fewer numbers of slices cut, the greater the pressure build up against the cutter, and the thicker the slices. This, of course, will only be true over certain speed and feed rate ranges because if the cutter rotates too slowly, pressure will build up and reduce the feed rate and throughput. However, over small ranges, the increase in pressure and throughput at constant speed of the cutter will automatically result in thicker slices. Thus, pressure, feedrate, and cutter speed (and number of cutting edges on the cutter) must all be taken into account and adjusted to give a desired slice thickness and desired throughput of product. It has been found that a wide range of speeds can be used from several revolutions per minute to several thousand revolutions per minute.

FIG. 10 shows an alternate embodiment of apparatus with alternate form of screw conveyor and a closed slicing chamber. Other parts of the apparatus are not shown but would be similar to FIGS. 1 and 2. The auger, which with feed tube 99 forms a screw conveyor is made up of two parts. Auger portion 100 is made of stainless steel and has a four inch pitch while auger portion 101, which is a continuation of auger portion 100 and extends for about the last six inches of the auger, is made of nylon or other relatively slippery material and has a three inch pitch. The feed hopper 102 gradually narrows down through transition portion 103 to feed tube 99 of desired diameter. The transition from hopper to feed tube may provide a slight compression for the material flowing from the hopper to the feed tube and generally provides a smoother flow path for the material. Ridges 104 around the interior walls of the feed tube and transition portion hold the material in the tube from rotating with the feed auger to ensure forward movement in the tube. The change in pitch for auger portion 101 also provides an increase in pressure of the material in the tube against the blade.

The nylon portion 101 of the auger is preferably made slightly larger in diameter than the steel portion 100 and is of a dimension to substantially completely fill tube 99 and just touch ridges 104. Since the auger is free floating at the discharge end of the tube, the nylon portion of the screw acts as a bearing within the tube and ensures that the auger remains centered.

It is generally desirable that the auger in the feed tube of any of the embodiments ends prior to the end of the tube so that a pressure chamber between the end of the auger and the end of the feed tube which is substantially blocked by the cutter is formed where the product to be sliced can fill the chamber and present a consolidated, pressurized mass to the cutter. Such chamber ensures that substantially all voids created by the auger flights will be filled and the product leaving the end of the tube will be of substantially constant volume. The length of the pressure chamber can vary greatly and need only be large enough to provide a consolodation of the product to be sliced. The chamber will generally be longer where the feed tube outlet is different in size or shape than the portion of the feed tube surrounding the auger such as where the size of the opening is smaller to achieve greater pressure on the product.

In some cases it is desired to slice meat product in a closed environment and to spray sauce on the meat as it is sliced and then convey the meat and sauce to a desired location for further processing or packaging. Thus, a cutter 108, FIGS. 10 and 11, is positioned for rotation essentially as shown in FIG. 1. The cutter itself is not shown in detail but may be similar to any of the cutters described. The curves of the cutting edges are shown outlined in broken lines at 108a and are shown as spiral curves designed to provide a substantially constant slicing action rather than as arcs shown in prior figures. A lower housing 109 mounted on support plate 110 similar to support plate 24 of FIGS. 1-4, surrounds the lower portion of cutter 108 and opens at its bottom directly to a screw conveyor 111 having auger 112 therein. A top housing 113 is hinged at 114 and fits over the top of cutter 108 to provide a completely closed housing. Top housing 113 may be opened about hinge 114 to provide access to cutter 108 and may be secured in closed position by bolt 115 passing through mating housing flanges 109a and 113a. The product feed tube outlet is positioned near the lower portion of housing 109 over one end of auger 112 so that the sliced product falls from cutter 108 into conveyor 111. A spray nozzle 116 is positioned at the end of supply pipe 117 and is directed toward the cutter 108 at the location where the sliced meat product 118 emerges from the cutter. Supply pipe 117 is connected to a source of pressurized sauce (not shown) which is sprayed onto the meat slice 118 as it is being sliced. The slice with sauce applied thereto falls into conveyor 111 where it is conveyed to a location for further processing or packaging. Additional spray nozzles may be positioned in the housing similarly to 116 to simultaneously or selectively spray different sauces or flavoring on the meat as it is sliced and in addition a misting spray nozzle can be positioned in housing 109 when it is desired to create a flavoring mist in the housing such as a mist of liquid smoke flavor rather than directly spraying the meat slices.

Scrapers 119 are provided on cutter 108 to ensure that particles thrown from the periphery of cutter 108 do not get stuck in the housing and are all directed into conveyor 111. The angle of scrapers 119 as mounted on cutter 108 as shown in FIG. 12 is such to direct any product in the housing to the slice discharge side of the cutter to fall with the sliced meat product into conveyor 111.

In various tests it has been found that the apparatus of the invention works well with either raw or cooked meat to produce uniform slices as thin as 1/32 inch and as thick as ½ inch. Thinner slices, down to about 1/40 inch, can be cut with meat products having some rigidity such as meat in a partially frozen (not solid) state.

As indicated, the slicer of the invention is particularly adapted to the slicing of raw and cooked meat. The invention includes a process for preparing a cooked meat product which involves the slicing of a hot meat product using the apparatus described above.

Figure 13:
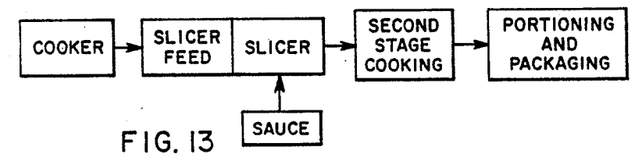
FIG. 13, a block diagram illustrating a process of the invention.

FIG. 13 shows a block diagram of the generalized process of the invention. The first step is partial cooking of the meat in a standard cooker such as a continuous oven, for example a model MPO 4021 multipurpose oven manufactured by Heat and Control Corp. of South San Francisco, California. Boneless meat chunks are placed on the oven conveyor belt and then pass through the oven to produce a meat roast product. However, the oven retention time is such that only partial cooking takes place with the outside of the meat chunks reaching a temperature above that to be classified as cooked but with the inside of the meat chunks not fully cooked. For example, with the oven indicated above having a forty inch wide belt extending twenty-one feet through the oven with an oven temperature between 500° and 550° F., the belt can be loaded at about seven pounds per square foot with meat chunks at about 40° F. and run to give an oven retention time of about sixteen minutes. This supplies enough heat energy to the meat so that when sliced without being allowed to cool substantially and the slices held together so that the temperature equalizes throughout the meat slices, the equalized temperature reaches about 155° F. which results in a fully cooked product. The loading indicated above gives a throughput of about 1470 pounds per hour of meat through the oven. The 500° to 550° F. operating temperature for the oven is higher than that generally used for cooking meat, but works well and allows a lesser oven retention time. As the meat chunks leave the oven, the temperature of the outer portion of the chunks may be around 400° F. while the centers may still only be about 40° F. Of course, the oven loading, temperature, and retention time may all vary substantially depending upon the size of the meat pieces being cooked, the type of meat, etc. For a reasonable throughput, however, it has been found that oven loading in the range of from three to eight pounds per square foot is satisfactory. It is preferred to collect any meat juices that run from the meat during roasting.

While an oven as described above is presently preferred as the cooker, other types of cookers can be used such as a continuous deep frier. With a continuous deep frier, it has been found that an oil temperature of about 280° F. gives a browned surface on the meat without burning the meat. The retention time is adjusted so that the meat gains enough heat so that through the remaining processing described, the temperature of the meat will equalize at a temperature giving a completely cooked product.

The partially cooked meat product is discharged from the cooker directly into the feed hopper of the slicer of the invention. It is preferred that the feed hopper and the cooker discharge be completely closed to the outside atmosphere to reduce heat loss from the product and maintain the product in a substantially sterile condition due to its outside temperature and the temperature of the air from the oven.

The partially cooked meat is sliced such as by using the slicer of the invention and as sliced, hot sauce is sprayed onto the meat slices. The sauce is preferably between about 180° and 210° F. so adds heats to the meat slices as well as spices and flavoring as desired. However, depending upon the temperature of the meat slices, the sauce may be at a lower temperature, but should be above the temperature at which the meat product is considered fully cooked. In many instances it will be desirable to collect the meat drippings and juices from the oven and mix them with the sauce to be sprayed on the meat, thereby returning some of the natural meat juices to the sliced product. If desired, mearly the natural meat juices may be used as the sauce. The slicing and sauce spraying takes place in a closed chamber such as shown and described for FIGS. 10 and 11. Sauce in the proportions of two parts meat to one or less part sauce has been found satisfactory. In addition to spraying sauce on the meat as it is sliced, flavoring such as liquid smoke may be misted into the closed slicing chamber to also add desired flavor to the meat slices. With liquid smoke, it has been found that misting one-third ounce of liquid smoke per each pound of meat passed through the chamber gives satisfactory results. If other additives are to be used in the finished product, such additives can be sprayed in individually at this stage or may be mixed with the sauce that is sprayed in.

The sliced meat product along with the sauce falls into a conveyor such as the screw conveyor shown in FIGS. 10 and 11 and is conveyed to a second stage cooking hopper which is merely a hopper where the product remains for the time required for the temperature of the meat and sauce to substantially equalize and fully cook the meat. The required retention time will depend upon various factors such as the size of the meat chunks, the temperature of the meat leaving the oven, the time and mixing involved in the conveying steps, the thickness of the slices, and the sauce temperature. Usually a retention time in second stage cooking hopper of about fifteen to thirty minutes is satisfactory to give a fully cooked product. However, longer times may be used, particularly with extra tough meat where longer cooking will tenderize the product. In some instances, the time in slicing and conveying the sliced product from the slicer to the portioning stage will be sufficient to provide enough equalization to bring all portions of the meat to a fully cooked temperature. Thus, in these instances, the conveyor is the second stage cooking and no holding hopper is required.

Once the sliced meat product has reached a substantially equalized temperature to be fully cooked and has been cooked for the desired time, the product may be portioned and packaged. This may be done in any manner. However, it is currently preferred to cool the product prior to portioning and such may be done by conveying the cooked sliced product using a Egretier Model 62 rotary pump made by Egretier and Co., Marbonne, France, from the second stage cooking hopper to the portioning device and providing a water jacket about the pump for cool water circulation.

Where individual portioning is desired, the product is then fed to a portioning machine such as a Formax Vertiform Filling System Portioning Machine Model No. 19 made by Formax, Inc., Makena, Illiois. The typical individual portion will be a patty shape about three to four ounces in weight, three to four inches in daimeter, and about five-eights inch thick. After portioning, the individual portions can be packaged by conventional means and then frozen, or the individual portions can be frozen and then packaged.

The portioning does not have to result in individual portions and may merely be the bulk packaging in approximate package weights or sizes of the meat slices, or may comprise the forming of the meat product into loafs or other items or stuffing the product into a casing or chubb. These items are packaged as desired and may be chilled or frozen as desired either before or after packaging.

FIG. 14 shows a variation of the process of FIG. 13 with the addition of an equilibration step between the cooker and the slicer feed. FIG. 14 also contemplates a completely closed system from cooker through packaging as indicated by the blocks being joined end to end. Such a closed system is preferred to reduce heat loss during the processing and to provide a substantially sterile environment through the entire processing so that the meat chunks which have their outer surfaces substantially sterilized by passing through the oven will not be contaminated by being exposed to outside air during processing. The air in the system after the oven will substantially be limited to that which is also sterilized by passing through the oven and being heated.

As shown in FIG. 14, the meat chunks are loaded into a cooker as described for FIG. 13. Upon discharge from the cooker, the meat chunks are allowed to equilibrate before being fed to the slicer. This stage is similar to the stage labeled second stage cooking in that it is merely allowing the chunks of meat with high outside temperatures and lower inside temperatures to rest together for a period of time to allow the higher outside temperature to penetrate into the chunks to thereby substantially equalize the temperature of the various chunks and preferably allow the inside of the chunks to reach a temperature where they are considered fully cooked, usually 145° F., or near a temperature where they are considered fully cooked, as desired. This equilibration stage may take the form of a hopper where the meat chunks rest for a desired period of time or equilibration may be accomplished in conveying the meat chunks to the slicer or, may take the form of a large feed hopper to the slicer. Equilibration time will usually be in the range of about fifteen minutes to two hours. This step, as opposed to the process of FIG. 13, contemplates at least some delay between the oven discharge and feed to the slicer. While full cooking can be reached in this equilibration step and is desired in some instance, and when fully cooked in this step before slicing, the second stage cooking is not necessary, the equilibration step may be used merely for partial equilibration and cooking wherein further equilibration and full cooking is achieved in the second stage cooking.

After equilibration, the meat pieces are fed to a slicer, such as the slicer of the invention, where they are sliced and, if desired, sauce or the natural meat juices as collected during the cooking stage, if possible, and the equilibration stage, are added to the slices. As described for FIG. 13, the sauce is preferably hot and is sprayed on during slicing. The mass of sliced meat and sauce is then allowed to equilibrate in the second stage cooking as described for FIG. 13. and then portioned and packaged. As explained above, the sauce may comprise only the collected meat juices with no other ingredients, and such juice may be further heated before being sprayed onto the slices.

If the meat pieces being sliced are fully cooked after the equilibration stage, or still have sufficient heat content to reach a fully cooked temperature in the second stage cooking, it is not necessary to add any sauce or juice to the sliced product. Further, if the meat pieces being sliced are fully cooked after the equilibration stage and before slicing, the second stage cooking step is not necessary and the individual slices could be conveyed away and packaged.

In some instances it is desirable prior to packaging the meat product to remove the oxygen from the atmosphere about the meat product. Meat packaged in an inert atmosphere such as one of nitrogen or carbon dioxide will generally have a longer shelf life and will have less discoloration than the same meat product packaged in the presence of oxygen. To reduce the oxygen and establish the inert atmosphere, the desired gas can be introduced into the processing atmosphere as and when desired. It has been found that an ideal location for the addition of the desired gas is during slicing of the meat pieces. Thus, a gas such as nitrogen or carbon dioxide may be added to the processing atmosphere during slicing. This gas will then substantially lower the proportion of oxygen in the processing atmosphere and result in less discoloration of the slices and, in the preferred closed system, will carry through to the packaging of the product.

Because of the importance in a commercial meat product line of insuring that all meat is fully cooked, the line of the invention can include a temperature monitor and alarm to monitor the temperature of the meat and sauce mixture during second stage cooking. Thus, a temperature probe or set of probes is mounted to measure the temperature of the sliced meat-sauce mixture toward the end of its equilibration time and a monitor is set to activate an alarm if the mass drops below a desired temperature, usually 145° F. As long as the individual slices of meat have been part of the mass of meat slices and sauce for a minimum period of time, the entire mass will reach a substantially uniform temperature and measuring the temperature of the mass will give an accurate indication of the minimum temperature of all pieces in the mass. In most instances thirty minutes of second stage cooking or equilibrating will be more than sufficient, although this time will vary with the thickness of the slices and initial temperature of the components of the mass.

While many variations to the process may be made, an important aspect of one embodiment of the process are the steps of partial cooking of the meat, slicing the meat, the addition of hot sauce where the term "sauce" includes not only conventional sauces but also other flavoring agents, additives, or meat juices alone or in combination, and allowing the temperature of the meat and sauce to equalize in what has been called second stage cooking to produce a fully cooked, sliced meat product. It is preferred that these steps be carried out in a completely enclosed environment.

In another embodiment of the invention, an important aspect of the process are the steps of partial cooking of the meat and allowing the pieces of partially cooked meat to equilibrate so that the entire pieces of meat reach a temperature, after equilibration, where they are considered fully cooked.

Whereas this invention is here illustrated and described with specific reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A process for producing a sliced meat product comprising the steps of partially cooking chunks of meat so that outside portions of the chunks reach a temperature over the temperature at which the meat is considered fully cooked, but inside portions remain below the temperature at which the meat is considered fully cooked; completely slicing said partially cooked chunks of meat before substantial cooling of the chunks of meat takes place, said slicing being such as to include both the portions of the chunks of meat having reached the temperature at which the meat is considered fully cooked and the portions of the chunks of meat which remain below the temperature at which the meat is considered fully cooked in said slices; adding sauce to said slices, said sauce being at a temperature above the temperature at which the meat is considered fully cooked; allowing the temperature of the meat and sauce mixture to equalize by allowing heat from the higher temperature portions of the meat and sauce to pass to the lower temperature portions at least to the extent that all portions of the meat slices reach the temperature at which the meat is considered fully cooked; portioning said meat product into preset portions; and packaging said product, and wherein the slicing of the meat chunks takes place in a closed atmosphere controlled to reduce the amount of oxygen present to a level below that in normal air by the addition to the closed atmosphere of nitrogen gas.

2. A process according to claim 1, wherein the process includes the step of freezing the preset portions prior to packaging.

3. A process according to claim 1, wherein the process includes the additional step of equilibrating the partially cooked chunks of meat between the partial cooking step and slicing step by allowing the partially cooked meat chunks to rest together in the closed atmosphere so that the difference in temperature between the inside and outside portions of such meat chunks will be reduced by the flow of heat from the higher temperature portions to the lower temperature portions.

4. A process according to claim 1, wherein the equalization step and the packaging step also take place in the closed atmosphere.

5. A process according to claim 1, wherein the preset portions are individual portions of the sliced meat product.

6. A process according to claim 1, wherein the preset portions are bulk portions of the sliced meat product.

7. A process according to claim 1, wherein the process includes the additional step of monitoring the temperature of the meat and sauce mixture to ensure that all portions of the mixture reach the temperature at which the meat is considered fully cooked.

8. A process according to claim 7, wherein an alarm is activated if the temperature of the meat and sauce mixture falls below a predetermined minimum temperature.

9. A process for producing a sliced meat product comprising the steps of partially cooking chunks of meat so that outside portions of the chunks reach a temperature over the temperature at which the meat is considered fully cooked, but inside portions remain below the temperature at which the meat is considered fully cooked; completely slicing said partially cooked chunks of meat before substantial cooling of the chunks of meat takes place, said slicing being such as to include both the portions of the chunks of meat having reached the temperature at which the meat is considered fully cooked and the portions of the chunks of meat which remain below the temperature at which the meat is considered fully cooked in said slices; adding sauce to said slices, said sauce being at a temperature above the temperature at which the meat is considered fully cooked; allowing the temperature of the meat and sauce mixture to equalize by allowing heat from the higher temperature portions of the meat and sauce to pass to the lower temperature portions at least to the extent that all portions of the meat slices reach the temperature at which the meat is considered fully cooked; portioning said meat product into preset portions; and packaging said product, and wherein the slicing of the meat chunks takes place in a closed atmosphere controlled to reduce the amount of oxygen present to a level below that in normal air by the addition to the closed atmosphere of carbon dioxide gas.

10. A process according to claim 9, wherein the process includes the step of freezing the preset portions prior to packaging.

11. A process according to claim 9, wherein the process includes the additional step of equilibrating the partially cooked chunks of meat between the partial cooking step and slicing step by allowing the partially cooked meat chunks to rest together in the closed atmosphere so that the difference in temperature between the inside and outside portions of such meat chunks will be reduced by the flow of heat from the higher temperature portions to the lower temperature portions.

12. A process according to claim 9, wherein the equalization step and the packaging step also take place in the closed atmosphere.

13. A process according to claim 9, wherein the preset portions are individual portions of the sliced meat product.

14. A process according to claim 9, wherein the preset portions are bulk portions of the sliced meat product.

15. A process according to claim 9, wherein the process includes the additional step of monitoring the temperature of the meat and sauce mixture to ensure that all portions of the mixture reach the temperature at which the meat is considered fully cooked.

16. A process according to claim 15, wherein an alarm is activated if the temperature of the meat and sauce mixture falls below a predetermined minimum temperature.

17. A process for producing a sliced meat product comprising the steps of partially cooking pieces of meat so that outside portions of the pieces reach a temperature over the temperature at which the meat is considered fully cooked, but inside portions remain below the temperature at which the meat is considered fully cooked; holding the partially cooked meat pieces together in a closed atmosphere without adding additional heat to such atmosphere so that heat will flow from the higher temperature meat portions to the lower temperature meat portions and holding said meat pieces in said closed atmosphere for a time period sufficient to allow the lower temperature meat portions to also reach a temperature at which the meat is considered fully cooked; slicing the now fully cooked pieces of meat before substantial cooling of the pieces takes place; portioning said slices into preset portions; and packaging said product, and wherein the closed atmosphere is controlled to reduce the amount of oxygen present to a level below that in normal air by the addition to the closed atmosphere of nitrogen gas.

18. A process according to claim 17, wherein the partially cooked meat pieces are held together for between about fifteen minutes and about two hours.

19. A process for producing a sliced meat product comprising the steps of partially cooking pieces of meat so that outside portions of the pieces reach a temperature over the temperature at which the meat is considered fully cooked, but inside portions remain below the temperature at which the meat is considered fully cooked; holding the partially cooked meat pieces together in a closed atmosphere without adding additional heat to such atmosphere so that heat will flow from the higher temperature meat portions to the lower temperature meat portions and holding said meat pieces in said closed atmosphere for a time period sufficient to allow the lower temperature meat portions to also reach a temperature at which the meat is considered fully cooked; slicing the now fully cooked pieces of meat before substantial cooling of the pieces takes place; portioning said slices into preset portions; and packaging said product, and wherein the atmosphere is controlled to reduce the amount of oxygen present to a level below that in normal air by the addition to the closed atmosphere of carbon dioxide gas.

20. A process according to claim 19, wherein the partially cooked meat pieces are held together for between about fifteen minutes and about two hours.

* * * * *